US008600371B2

(12) United States Patent
Caudill et al.

(10) Patent No.: US 8,600,371 B2
(45) Date of Patent: Dec. 3, 2013

(54) METHOD AND SYSTEM FOR DIAGNOSING RADIO PERFORMANCE DURING FUNCTIONAL OVER-THE-AIR OPERATION

(75) Inventors: Danny Caudill, Melbourne, FL (US); Michael Keefe, West Melbourne, FL (US); Charna Parkey, Orlando, FL (US); Robert Mitchell, Orlando, FL (US); Murad Qahwash, Orlando, FL (US); John McCarthy, Palm Bay, FL (US)

(73) Assignee: Locus Location Systems LLC, West Melbourne, FL (US)

( * ) Notice: Subject to any disclaimer, the term of this patent is extended or adjusted under 35 U.S.C. 154(b) by 51 days.

(21) Appl. No.: 13/106,812

(22) Filed: May 12, 2011

(65) Prior Publication Data

US 2011/0319029 A1    Dec. 29, 2011

Related U.S. Application Data

(63) Continuation-in-part of application No. 12/882,193, filed on Sep. 14, 2010.

(60) Provisional application No. 61/252,693, filed on Oct. 18, 2009.

(51) Int. Cl.
*H04W 24/00*        (2009.01)

(52) U.S. Cl.
USPC ..... 455/423; 455/425; 455/67.11; 455/67.14; 455/67.15; 455/67.7; 455/115.2; 455/115.3; 455/115.4; 370/241; 370/242; 370/248; 370/252; 370/253

(58) Field of Classification Search
USPC ............ 455/115.1–115.4, 67.11–67.16, 67.7, 455/423, 425; 370/241, 242, 248, 252, 253
See application file for complete search history.

(56) References Cited

U.S. PATENT DOCUMENTS

| 4,554,410 | A | 11/1985 | Furumoto |
| 5,973,643 | A | 10/1999 | Hawkes |
| 5,987,306 | A | 11/1999 | Nilsen |
| 6,308,065 | B1 | 10/2001 | Molinari et al. |
| 6,671,291 | B1 | 12/2003 | Soliman |
| 6,745,011 | B1 | 6/2004 | Hendrickson |
| 6,873,601 | B1 | 3/2005 | Chow |
| 6,965,769 | B2 | 11/2005 | Bims |
| 7,346,346 | B2 | 3/2008 | Lipsit |

(Continued)

OTHER PUBLICATIONS

Written Opinion of the International Searching Authority dated Aug. 3, 2012 for International Application No. PCT/US12/37037.

*Primary Examiner* — Junpeng Chen
(74) *Attorney, Agent, or Firm* — Mayback & Hoffman, P.A.; Gregory L. Mayback

(57) ABSTRACT

An apparatus for determining a health of radio-frequency transmitters each transmitting a transmitted signal during normal operation. The apparatus comprises a receiver for receiving received signals, each received signal responsive to a transmitted signal, a first element for determining signal parameters of each received signal, the signal parameters responsive to an operating condition of a transmitter, each transmitted signal and each associated received signal including an identifier of the transmitter that transmitted the transmitted signal, the apparatus using the identifier to link determined signal parameters with the transmitter that transmitted the transmitted signal and a second element for determining a health of the transmitter that transmitted the transmitted signal, the health responsive to a relationship between one or more signal parameters and a selected value or a range of selected values for each signal parameter.

19 Claims, 1 Drawing Sheet

(56) References Cited

U.S. PATENT DOCUMENTS

| | | |
|---|---|---|
| 7,881,206 B2 | 2/2011 | St. Pierre et al. |
| 7,913,182 B2 | 3/2011 | Bear et al. |
| 8,000,700 B2 * | 8/2011 | Choi et al. .................. 455/425 |
| 2002/0009992 A1 | 1/2002 | Jensen |
| 2002/0072359 A1 | 6/2002 | Moles |
| 2003/0061340 A1 | 3/2003 | Sun et al. |
| 2004/0032836 A1 | 2/2004 | Grilli et al. |
| 2004/0142699 A1 | 7/2004 | Jollota |
| 2004/0203489 A1 | 10/2004 | Comerford |
| 2006/0003776 A1 | 1/2006 | Natori |
| 2006/0030270 A1 | 2/2006 | Cheng |
| 2006/0141998 A1 | 6/2006 | Kennedy et al. |
| 2006/0205398 A1 | 9/2006 | Seckendorf et al. |
| 2007/0178843 A1 * | 8/2007 | Singh et al. ................ 455/67.11 |
| 2008/0095131 A1 | 4/2008 | Aljadeff |
| 2008/0113623 A1 | 5/2008 | Gormley |
| 2009/0052330 A1 | 2/2009 | Matsunaga |
| 2009/0082009 A1 * | 3/2009 | Nagy et al. ................... 455/423 |
| 2009/0098867 A1 | 4/2009 | Varanda |
| 2009/0098868 A1 | 4/2009 | Cheng |
| 2009/0310501 A1 | 12/2009 | Catovic et al. |
| 2010/0020717 A1 | 1/2010 | McGregor et al. |
| 2010/0197299 A1 | 8/2010 | Huber |
| 2010/0254267 A1 * | 10/2010 | Blackwell .................... 370/241 |
| 2010/0259448 A1 | 10/2010 | Qahwash |
| 2011/0090807 A1 | 4/2011 | Caudill et al. |

\* cited by examiner

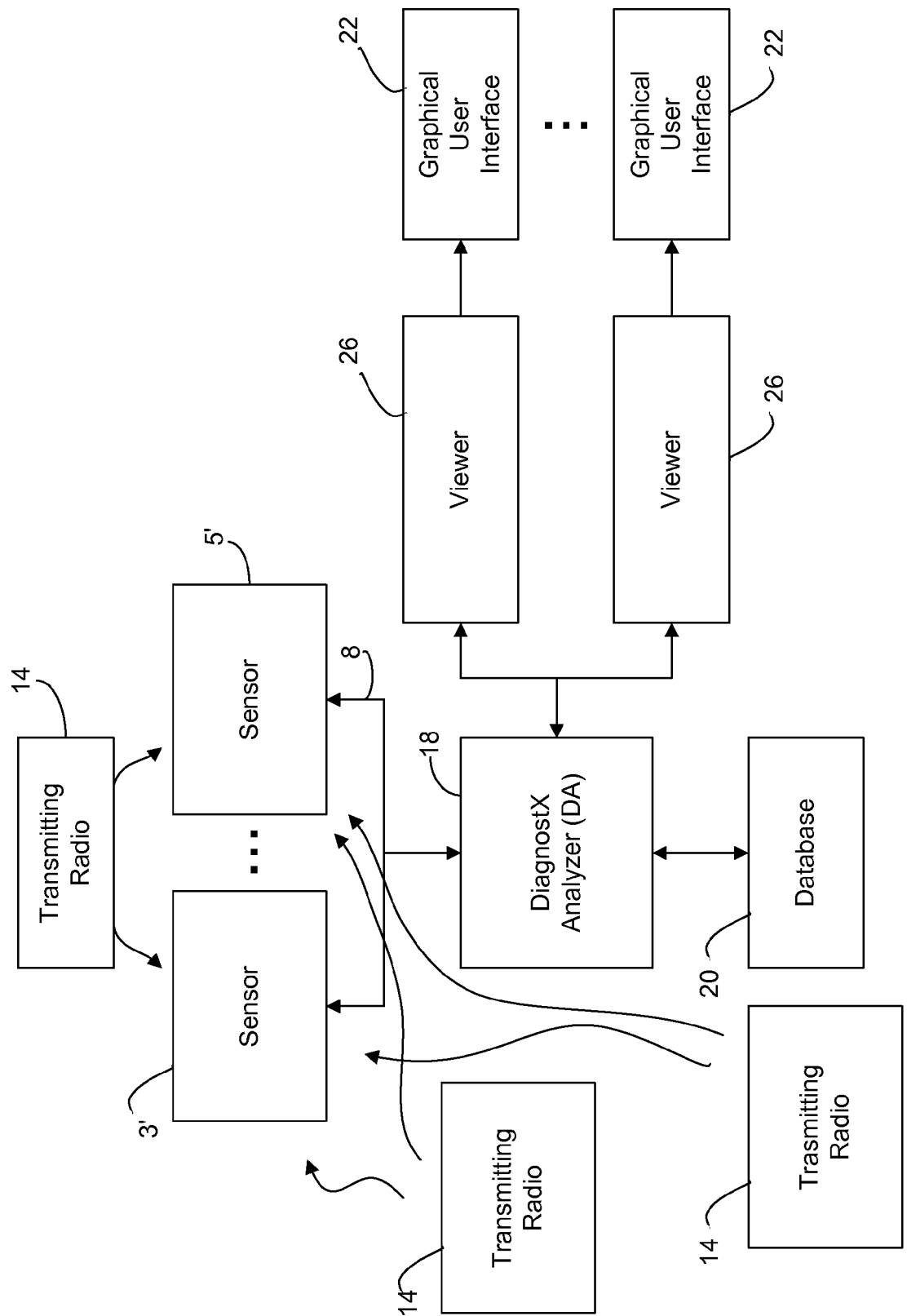

METHOD AND SYSTEM FOR DIAGNOSING RADIO PERFORMANCE DURING FUNCTIONAL OVER-THE-AIR OPERATION

CROSS-REFERENCE TO RELATED APPLICATIONS

This patent application is a continuation-in-part application claiming priority to the application filed on Sep. 14, 2010, assigned application Ser. No. 12/882,193 and entitled Method and System for Analyzing Radio Performance During Over-the-Air Operation, which claims priority to the provisional application filed on Oct. 18, 2009, assigned application No. 61/252,693 and entitled Method and System for Analyzing Radio Performance During Over-The-Air Operation.

BACKGROUND OF THE INVENTION

The ability of a communications transmitter/receiver (referred to as radios in some networks) to operate according to its specifications is crucial to proper communications between the transmitter and the receiver. Sometimes a user does not realize the radio is not operating according to its specification until it fails completely. A faulty radio must be taken out of service, the cause of the failure diagnosed and the radio repaired. The present invention overcomes these limitations by advising the user when a specification parameter is not met, albeit the radio may continue to operate at a degraded level.

BRIEF DESCRIPTION OF THE FIGURES

The present invention can be more easily understood and the advantages and uses thereof more readily apparent when the following detailed description of the present invention is read in conjunction with the figures wherein:

The FIGURE is a block diagram of the principle components of the present invention.

In accordance with common practice, the various described features are not drawn to scale, but are drawn to emphasize specific features relevant to the invention. Like reference characters denote like elements throughout the figures and text.

DETAILED DESCRIPTION OF THE INVENTION

Before describing in detail a method and system for diagnosing radio performance during functional over-the-air operation, according to the present invention, it should be observed that the present invention resides in a novel and non-obvious combination of structural elements and method steps. Accordingly, these elements have been represented by conventional elements and steps in the drawings and specification. The elements and method steps conventionally known in the art are described in lesser detail, and elements and steps pertinent to understanding the invention are described in greater detail. The following preferred embodiments are an application of the present invention and are not intended to define limits of the structure or use of the invention, but only to provide exemplary constructions. Many variations can be made to the described diagnostic system within the scope of the presented claims.

As used herein the term "radio" refers to any transceiver, transmitter or receiver transmitting or transmitting and receiving RF signals. Mobile and portable transceivers used in public safety trunked networks are commonly referred to as radios. As used herein, the term "radio network" refers to a communications network comprising such radios. The radios may comprise mobile, portable or stationary transceivers operating in a network environment, with each radio transmitting a radio frequency signal for receiving by another radio within the network. In some applications the signal is carried from the transmitter to the receiver via a network base station.

The teachings of the invention, commercially referred to as a DiagnostX System, can be employed to determine the "health" of individual radios, whether the radio operates in or outside of a network. The system of the invention can identify incipient and real-time radio problems to reduce radio downtime and improve the "health" of the radio. By ensuring good radio health, each radio can effectively communicate with other radios (and a base station), whether operating in or independent of a network.

The invention determines radio health in real-time as the signal is received and radio signal parameters are measured. Alternatively, the signal or the measured signal parameters can be stored for later analysis and diagnosis.

Any over-the-air signal transmitted during normal operation of the radio is sufficient to diagnose radio health. The present invention does not require removing the radio from active service to evaluate the "health" of the radios. No special test period or test signal is required. Since the "health" of each radio is determined during over-the-air operation, prior art bench tests are not required.

The diagnostic system of the invention extracts the necessary signal parameters from which the health of the radio that transmitted the signal can be determined. The invention operates for any signal protocol, waveform and format and also for an encrypted or an unencrypted signal. However, the diagnostic system must know, in advance, the radio signal protocol and format to determine whether the transmitted signal complies with that signal protocol and format.

When used in the present application, the term radio "health" refers to performance in accordance with applicable performance and signal specifications and radio specifications, as determined by the radio manufacturer, the user or the network operator. That is, the network operator may require tighter tolerances for certain signal parameters due to the characteristics of its network.

One application of the present invention applies to radios operating in a trunked radio system that includes a location-determining subsystem for determining the location of any transmitting radio. In this application the radio health is important to accurately locate the radio and thus its operator.

To determine the health of individual radios, the system comprises a signal receiver (also referred to as a sensor) at a base station or at another location where radio transmissions can be received. Alternatively the base station equipment itself can serve as the receiver. The receiver or associated devices determine the signal parameters of a signal transmitted by a radio and received at the receiver. These determined signal parameters reflect the condition of the radio that transmitted the signal. The determined signal parameters are associated with the transmitting radio using a radio identifier, which is one element of every radio transmission.

The radio user (or network operator) determines beforehand the radio characteristics that must be satisfied before the radio health is declared to be "good." Generally, this determination is somewhat subjective and differs among networks. In any case, a "good health" conclusion is based on multiple samples of the signal parameters of interest. Further, a range of performance values or a combination of two or more values, for example a range of SNR values versus signal strength, are used to conclude that the radio is in "good health." Any marginal or poor health radios are scheduled for maintenance to return the radio to "good" health. Also, any cloned radio, which can be determined by comparing signal parameters from radios with the same radio identifier, are also not declared as "good" radios.

The present invention can also determine whether a radio is operating according to pertinent regulations promulgated by a regulatory agency, such as the U.S. Federal Communication Commission or similar regulatory agencies of other countries. These regulations dictate the operating requirements of both licensed and unlicensed transmitting devices. The invention can also determine if a radio operates within its published specifications, apart from any applicable government regulations.

The invention verifies and/or determines the health of radios using over-the-air transmissions from the radio. For example, when a radio in a trunked radio network transmits (on an inbound channel) a request for a working channel (i.e., the channel or frequency for carrying a subsequent communication with another radio in the network) to a network controller, the system of the invention captures the transmitted signal/waveform on the inbound channel and analyzes (either in real time or later using stored signal values) the waveform for possible failures, problems or out-of-spec parameters, etc. The system can also listen to the outbound control channel over which the radio is advised of its assigned working channel and follow the radio to its assigned working channel to capture and analyze working channel transmissions.

The invention captures inbound and outbound control channel signals and working channel signals to measure operational characteristics of the radio, based on measured signal parameters, when operating in a transmitting mode and to detect potential radio transmission problems. The network operator can remove the radio from service for repair or undertake other maintenance actions as deemed advisable. The signal measurement and analysis features of the invention are intended to reduce radio failures in the field and to identify suspect radios before they fail. When used in conjunction with a location-determining system, the present invention also improves the accuracy of the determined locations by ensuring that each radio is operating according to its specifications. As applied to a trunked radio system, a better operating radio can also reduce the number of control channel retries and therefore increase the system throughput or capacity.

One signal parameter determined by the invention is a received signal strength indicator (RSSI) value. This value should generally be within a desired range of predetermined RSSI values to permit meaningful analysis of the other signal parameters and radio operating characteristics. Signals with RSSI values outside of this range should be notated with an indication that the RSSI value was outside the desired range.

To set up the radio diagnostic process, an identifier for each radio is entered into the database or the identifier is collected as each radio transmits a signal. The operating characteristics or parameters to be collected are also entered manually or selected from a presented menu. The specifications for individual radios are determined by the operating features of that radio, e.g., transmission type, protocol type. For example, each radio may have a different specification and a different range of permitted deviations from that specification. Further, a first specification range may be established to identify potential problem radios. An signal parameter within the first range indicates a suspect radio. A second specification range may be established to identify failed radios. An operational parameter within the second range indicates a failed radio that should be removed from service for repair.

The FIGURE illustrates a block diagram of the radio health invention. This invention includes one or more signal receivers or sensors 3', 5' that receive RF signals from transmitting radios 14 and measure characteristics/parameters of the signal to determine the health of the radio. The measured parameters are sent to a diagnostic analyzer 18 over a backhaul link 8.

In one embodiment, each receiver 3', 5' uses one or more omnidirectional or directional antennas or a plurality of antennas that provide diversity reception and may thereby increase a signal strength of a received signal. Each receiver further includes (not specifically illustrated) a receiver, a digital signal processor, a precision oscillator and a general purpose processor. These devices cooperate, under control of the processor, to measure various signal parameters of the transmitted signal to determine the health of the radio that transmitted the signal.

Those skilled in the art recognize that as technical advancements occur, the receiver may include other, different, or additional components. For example, as the processing power of a general purpose processor increases, the functions associated with a digital signal processor may be executed by a general purpose processor.

An identifier associated with each radio and included in each signal transmitted by that radio is used to link the determined radio signal parameters to the transmitting radio. The receiver may assign a second identifier, referred to as a diagnostic identifier, to the radio based on the identifier included within the signal. The diagnostic identifier may be used to identify the radio during the radio diagnosis process and the reporting of results.

A database 20 stores the radio identifiers for radios to be monitored (and in one embodiment a list of identifiers for radios that are not to be monitored). The database 20 stores the pertinent specifications, desired operating characteristics, signal parameters and parameter ranges for each radio and/or each protocol. The database also stores the actual operating characteristics for each radio, where the actual operating characteristics are determined from the signals transmitted from the pertinent radio as those signals are received and analyzed by the diagnostic system of the present invention.

The receiver measurements are input to the DiagnostX Analyzer (DA) or master controller 18 that performs calculations and determines whether the signal parameter measurements indicate that one or more operating characteristics of the radio are outside of the pertinent specification ranges for that radio. These calculations can be performed in real time or later after the receiver data collection process has ended. When certain parameter ranges are exceeded the radio may be flagged as suspect and when other ranges are exceeded the radio may be flagged as failed.

Results from the DA 18 are displayed on a graphical user interface (GUI) 22 under control of a viewer 26 that pulls data for the GUI 22 from the DA 18 and the database 20. For example, the GUI 22 may display the radio identifier and signal measurements associated with the identified radio. The system can also identify (highlight) and display pertinent information for any radio with potential or incipient problems, including a general textual description of the problem.

The display can also depict any number of measured signal parameters. Typically the displayed parameters are those that are most directly indicative of a radio problem or potential problem. The displayed parameters can also be ranked (e.g., from high to low or vice versa) with an indicator of those parameters that are within or outside of the specification for that radio. The user can visually scan the displayed list and determine the radios may be problematic.

The system can also incorporate Boolean logic by logically combining certain measured parameters to determine the radios that are problematic or that may display incipient problems.

From the DA 18, the analysis results are also stored in the database 20 for later retrieval and/or additional analysis. The database 20 can be searched by radio identification number to retrieve performance data for selected radios. For use during post processing, the database 20 can also store the radio signal parameter data.

After a radio has been repaired, the collected performance parameters can be cleared from the database 20 as they are generally no longer relevant after radio repair.

This invention can also target specific radios for additional and more detailed over-the-air or bench analysis. Such radios can also be identified in the database 20. In one embodiment, signal parameters for the targeted radios can be collected more frequently than the other radios in the database. The radio identifier or the diagnostic identifier can be used to capture signals transmitted by the radios of interest.

The invention generates, displays, and prints numerous reports including but not limited to:

- Good radios, i.e., those that satisfy predefined operating thresholds or satisfy associated specifications
- Suspect radios as determined from standard industry conformance testing and operational specifications
- Radios unauthorized to operate on the system. Those radios are identified by the DiagnostX System as DNA radios (DiagnostX Network Anomaly). For example, DNA radios can be identified by determining that two or more transmissions using the same radio identification did not originate from the same radio (because the determined signal parameters do not match).
- Radios emitting a weak signal, where weak is defined as an RSSI below a predetermined threshold or below the specification for the associated radio.
- Radios with an insufficient number of transmissions to permit an accurate determination of the radio's health.
- Radios not in regular use
- Other reports according to user-defined subject matter
- Waveform visualization
- Bit-field visualization (i.e. as determined by a packet sniffer)
- The radio or the diagnostic identifier for each radio listed in the report.

An analysis of the received signal and its waveform provides information on the operational aspects of each radio, including but not limited to the following operational attributes.

- RF frequency accuracy
- RF frequency offset (i.e., offset from an assigned frequency)
- Timing of RF frequency offsets relative to a beginning of a message
- RF frequency offset variations throughout a message
- Frequency deviation of the modulated signal (i.e., the difference between the center frequency of the received signal and the modulated frequency)
- Range of frequency deviations over time
- Maximum frequency deviation
- Unexpected amplitude variations during a message
- Symbol frequency error
- Symbol clock error
- Modulation fidelity
- Bit error rate
- Conformance to packet structure specifications
- Baud rate changes during a message
- Spurious emissions
- Received signal strength indicator (RSSI)
- Consistent low power level irrespective of radio location
- High bit error rate irrespective of radio location
- Battery charge
- Probable emission mask non compliance
- Communication retries that exceed a user-defined threshold (as applied to a trunked network). This parameter can also be determined with respect to a specific base station in a trunked network, i.e., whether a specific base station on the network is experiencing a substantial number of retries (i.e., for radios that are trying to establish a communications link with the base station).
- An unexpectedly low received signal strength based on the location of the radio and the location of the receiver
- Number of dropped signals To assist with the analysis of each radio, the operator can define different signal parameter thresholds (e.g., frequency offset, frequency deviation) for one or more radios by reference to the radio identifier or the diagnostic identifier. This feature thus allows different thresholds to be established for different radios or for different groups of radios. In the latter case, all radios in a group can be assigned identical signal parameter thresholds, but different thresholds can be assigned among the different groups. The system can also rank the radios (within each group or across all groups) from those with the best performance to those with the worst performance according to one or more selected signal parameters.

A radio exhibiting a signal parameter that exceeds a threshold is indicated on the GUI 22 or set forth in a printed report or tabular report. These radios may be classified as good, suspect, or failed. In one embodiment the number of analyzed transmissions and the time period over which the data is collected must satisfy minimum thresholds before the radio can be identified as suspect or failed.

The diagnostic system operator can also determine and configure the system with the length of time the historical operational data is stored (e.g., a storage time parameter such as last year, last six months, etc.), the frequency at which the signal parameters are collected (e.g., one daily performance snapshot, weekly, monthly) and the signal parameters measured during each snapshot.

The system can generate and send e-mail alerts to users and system operators. For example, each morning an email listing the worst performing or suspect radios can be sent to system operators or to the user of each listed radio. The users of the listed radios and the system operators should consider these radios when communicating with or trying to locate any of the listed radios. The alert criteria are also user-defined (e.g., frequency of emails, email distribution list).

If the system operator is interested in the performance of only a subset of the radios, the operator generates a list of those radios and configures the system to monitor the performance of only the listed radios (according to the radio identifier or the diagnostic identifier).

The system can also store and display:

- A minimum RSSI threshold before operational data is collected
- A median calculation on the collected data to statistically eliminate any outliers for a radio.
- Radio repair dates tied to a radio identifier (preferably a radio serial number or another unique radio identifier, such as the diagnostic identifier). A repair technician enters the radio identifier into the system before beginning the repair and a system-generated date is used as the repair date. When a repair date is entered the historical performance data and all radio transmissions are cleared A suspect radio can be cleared of all recorded performance measurements and events to restart the collection and evaluation process for the radio. The system—generated date/time is used as the "clear" date Store the previous n performance data measurements for every radio Maintain lists and pertinent data that indicate the health of each radio according to the parameters that the user or system operator defines for a suspect, failed and a properly operating radio. For example, the lists can indicate a radio always transmitting signals below a user-defined RSSI threshold, above a user-defined threshold but based on fewer than n measurements, and a subjective judgment as to the radio's health (e.g., good or suspect) and the metrics on which the judgment is based. The user or system operator can also define the contents of any list and data reporting requirements for any radio.

Generate or use an operator-provided list of radio identification information that identifies radios for which performance data has not been collected Ensure the radios meet FCC mandated performance requirements Install software updates or synthetic instrumentation via an Internet connection or manually from a CD or USB drive When a signal from a radio is detected (referred to as an event), radio identification information, date and time information, and measured signal parameters for that radio are determined and stored. The signal parameters are analyzed (in real time or later during post processing) to determine the health of the radio. Tracking the time the event is recorded allows the system to time-align events if multiple receivers are used to determine radio signal parameters.

The system can track radios by serial number, radio ID, or diagnostic ID, or another unique identifier. This is useful in systems where radios are reconfigured with different identifiers because it allows all historical performance information to link to the same physical radio.

The system can also track cloned radios, referred to as diagnostic network anomalies (DNA) by identifying radios with the same radio identifier but with different determined signal parameters.

In one embodiment, after a location of the radio is determined by a radio-location system, the RSSI signal parameter can be used as one parameter to assess radio health, where the health determination takes account of the distance between the transmitting radio and the receiver. Other location-dependent parameters can also be used to determine radio health once the location has been determined.

The diagnostic information can also be collected during a drive test by a moving vehicle. As the vehicle traverses a network region, a receiver (and in one embodiment the associated radio parameter collecting equipment) on board the vehicle collect pertinent radio performance data for real time or later analysis.

To identify incipient radio problems, the network operator can set a relatively tight tolerance for radio operation; any performance parameters outside this range, while not indicative of a failure, may be evidence of a potential problem. Thus parameters outside the user-defined range may trigger an incipient problem alert.

The present invention may incorporate packet sniffing technology to determine that a radio is compliant with the applicable packet/signal specification and interoperability between systems operated by different network providers, e.g., as used by different government agencies, government departments or private users. For each transmission captured by the diagnostic systems, a representation of the protocol is presented, providing the user with enough information to determine whether each radio complies with its applicable protocol specification.

Certain features of the present invention may require knowing the location of a radio if such information is not included in the radio transmissions. Location methods that may be used in determining geographic location may include but are not be limited to;

Global Positioning System (GPS)
Assisted GPS (AGPS)
Cellular ID (CID)
Enhanced-cellular ID (E CID)
Timing Advance (TA)
Timing advance with network measurement reporting (TANMR)
Site ID (SID)
Enhanced observed time difference (E-OTD)
Time of arrival (TOA)
Time difference of arrival (TDOA)
Angle of arrival (AOA)
RF pattern matching (location fingerprinting)
Differential RSSI
Known static location For example, the location can be determined by performing a time of arrival measurement at each receiver and then calculating the location at the DiagnostiX analyzer 18 of the FIGURE. Alternatively, each radio may contain its location (as determined by a GPS technique) in each transmission or the location information may transmitted on an alternative channel. The location information may be stored in a database.

It is recognized that a declaration that a radio has failed or a failure is incipient is somewhat subjective and based on the signal parameter ranges used to make such a determination. Similarly, a declaration that a radio has "good health" is also subjective. However, the radio user, network operator or other affected party may select the signal parameter ranges as desired to ensure that a declaration as to the quality of a radio achieves the desired objectives.

Although the invention has been shown and described with respect to a certain preferred embodiments, it is obvious that equivalent alterations and modifications will occur to others skilled in the art upon the reading and understanding this specification and the annexed drawing. In particular regard to the various functions performed by the above described components (assemblies, devices, circuits, etc.), the terms used to describe such components are intended to correspond, unless otherwise indicated, to any component that performs the specified function of the described component (i.e., that is functionally equivalent), even though not structurally equivalent to the disclosed structure that performs the function in the illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. An apparatus for determining a health of a mobile radio-frequency transmitter, the apparatus comprising:
a receiver for receiving a received signal responsive to a transmitted signal transmitted from the mobile transmitter, the transmitted signal transmitted during normal over-the-air operation of the mobile transmitter and not having known signal characteristics;

a first element for determining a first signal parameters value of the received signal, the first signal parameter value responsive to signal power of the received signal;

the first element for determining additional signal parameter values of the received signal;

the transmitted signal and the received signal each including an identifier of the mobile transmitter, the identifier for linking the first signal parameter value and the additional signal parameter values with the mobile transmitter; and a second element for determining whether the first signal parameter value exceeds a predetermined value;

if the first signal parameter value exceeds the predetermined value, the second element for determining a health of the mobile transmitter, the health responsive to a relationship between one or more of the additional signal parameter values and a respective specification value or a range of respective specification values for each one of the additional signal parameter values, wherein the respective specification value or the range of respective specification values are independent of distance and link quality between the mobile transmitter and the receiver.

2. The apparatus of claim 1 wherein the first signal parameter comprises a signal strength related parameter.

3. The apparatus of claim 2 wherein the signal strength signal related parameter is responsive to a location of the transmitter relative to a location of the receiver.

4. The apparatus of claim 2 wherein the signal strength related parameter comprises RSSI, SNR, received signal power, or another power-related parameter.

5. The apparatus of claim 1 wherein the receiver is disposed onboard a moving vehicle or is disposed at a fixed location.

6. The apparatus of claim 1 wherein the additional signal parameter values comprise frequency-related signal parameter values of the transmitted signal.

7. The apparatus of claim 6 wherein the frequency-related signal parameter values comprise one or more of RF frequency accuracy, RF frequency offset, timing of RF frequency offsets relative to a beginning of a message, RF frequency deviations throughout a message, frequency deviation of a modulated signal, a range of frequency deviations over time, maximum frequency deviation.

8. The apparatus of claim 1 wherein the health comprises one of a failed transmitter, a suspect transmitter, and a good transmitter.

9. The apparatus of claim 1 wherein the additional signal parameter values for a first group of additional signal parameters are determined more frequently than additional signal parameter values for a second group of additional signal parameters.

10. The apparatus of claim 1 wherein the additional signal parameters values comprise one or more of amplitude variations during a message transmission, symbol frequency error, symbol clock error, modulation fidelity, bit error rate, conformance to packet structure specifications, baud rate changes during a message transmission, spurious emissions, consistent low power level irrespective of location of the transmitting device, high bit error rate irrespective of location of the transmitting device, battery charge, and a number of retries over a predetermined threshold.

11. The apparatus of claim 1 configured with a storage time parameter for identifying a period of time for storing the first and the additional signal parameter values and configured with a data collection frequency parameter for identifying a frequency at which the first and the additional signal parameter values are determined.

12. The apparatus of claim 1 wherein the mobile transmitter comprises a transmitter operating in a trunked radio network, and wherein the received signal comprises at least one of a request from the mobile transmitter to a network controller for an inbound channel and an inbound channel carrying transmissions from the mobile transmitter.

13. The apparatus of claim 1 operating in conjunction with a location-determining system for determining a location of the mobile transmitter in a trunked radio network, and wherein one or more of the first or the additional signal parameter values of a signal transmitted by the mobile transmitter must satisfy a predetermined threshold before the location-determining system determines a location of the mobile transmitter.

14. The apparatus of claim 1 wherein the identifier comprises a radio identifier or a diagnostic identifier.

15. The apparatus of claim 1 wherein the frequency of determining the first and the additional signal parameter values is user-defined for each mobile transmitter.

16. The apparatus of claim 1 further comprising a component for issuing email alerts identifying failed or suspect mobile transmitters.

17. The apparatus of claim 1 wherein the second element determines whether the received signal is compliant with applicable signal packet specifications.

18. The apparatus of claim 1 wherein the receiver is collocated with a base station of a network or the receiver comprises an element of the base station.

19. A method for determining a health of a radio-frequency (RF) transmitting device, the method comprising:

at a receiver, receiving an RF signal transmitted from an RF transmitting device, the transmitted signal transmitted during normal over-the-air operation of the RF transmitting device and not having known signal characteristics;

measuring a first signal parameter value related to signal power and measuring additional signal parameter values of a received RF signal, the received RF signal responsive to the transmitted signal;

determining whether the first signal parameter value exceeds a threshold value for the first signal parameter value;

determining a health of the RF transmitting device responsive to the additional signal parameter values only when the first signal parameter value exceeds the threshold value, wherein the health is responsive to a relationship between each one of the additional parameter values and a respective specification value for each one of the additional signal parameter values, wherein the specification values are independent of distance and link quality between the transmitting device and the receiver; and wherein the received RF signal includes an identifier of the RF transmitting device, using the identifier to link a health determination with the RF transmitting device.

* * * * *